US008516765B2

(12) United States Patent
Shaw et al.

(10) Patent No.: US 8,516,765 B2
(45) Date of Patent: Aug. 27, 2013

(54) FOAMED BUILDING PANEL, CLIP AND SYSTEM FOR INSTALLATION

(75) Inventors: Robert Shaw, Parma, MI (US); David Beck, Jackson, MI (US); David Stucky, Grass Lake, MI (US); David Steele, Jackson, MI (US); Robert Dodd, Parma, MI (US); Jamie Valentine, Rives Jct, MI (US)

(73) Assignee: Certainteed Corporation, Valley Forge, PA (US)

( * ) Notice: Subject to any disclaimer, the term of this patent is extended or adjusted under 35 U.S.C. 154(b) by 50 days.

(21) Appl. No.: 12/527,778

(22) PCT Filed: Nov. 5, 2008

(86) PCT No.: PCT/US2008/082476
§ 371 (c)(1),
(2), (4) Date: Jul. 20, 2010

(87) PCT Pub. No.: WO2010/050994
PCT Pub. Date: May 6, 2010

(65) Prior Publication Data
US 2010/0281801 A1    Nov. 11, 2010

Related U.S. Application Data

(60) Provisional application No. 61/108,939, filed on Oct. 28, 2008.

(51) Int. Cl.
*E04D 1/00*      (2006.01)
(52) U.S. Cl.
USPC ............................................. 52/553; 52/489.1

(58) Field of Classification Search
USPC ................... 52/553, 543, 544, 545, 551, 552, 52/489.1, 489.2, 478
See application file for complete search history.

(56) References Cited

U.S. PATENT DOCUMENTS

| | | | | |
|---|---|---|---|---|
| 1,978,519 A | * | 10/1934 | Willock et al. | 52/470 |
| 2,264,546 A | * | 12/1941 | Ochs | 52/521 |
| 2,607,449 A | * | 8/1952 | Daniels | 52/553 |
| 2,924,963 A | * | 2/1960 | Taylor et al. | 52/509 |
| 3,001,332 A | * | 9/1961 | Wilder | 52/302.1 |
| 3,004,483 A | * | 10/1961 | Prager et al. | 454/275 |
| 3,158,960 A | * | 12/1964 | Newton et al. | 52/302.1 |
| 3,236,932 A | * | 2/1966 | Grigas et al. | 52/543 |
| 3,248,835 A | * | 5/1966 | Westlind | 52/404.4 |
| 3,420,024 A | * | 1/1969 | Salvo | 52/316 |
| 3,504,467 A | * | 4/1970 | Caulfield et al. | 52/309.1 |

(Continued)

OTHER PUBLICATIONS

U.S. Appl. No. 11/588,577, filed Oct. 27, 2006.

(Continued)

*Primary Examiner* — William Gilbert
*Assistant Examiner* — James Ference
(74) *Attorney, Agent, or Firm* — Alexander H. Plache; Abel Law Group, LLP

(57) ABSTRACT

A building panel has a unitary foamed core, and a unitary cover layer of resinous polymeric material covering the core and covering a bottom edge or drip edge and an upper edge of the panel. A system for installation of adjacent panels includes the adjacent panels having vertical clip-receiving grooves slidably receiving narrow edges of a clip. The clip holds adjacent panels in coplanar abutting relationship to minimize movement while installed on a wall of a building.

14 Claims, 11 Drawing Sheets

(56) References Cited

U.S. PATENT DOCUMENTS

| | | | | |
|---|---|---|---|---|
| 3,552,078 | A * | 1/1971 | Mattes | 52/520 |
| 3,559,359 | A * | 2/1971 | Talbert | 52/394 |
| 3,977,145 | A * | 8/1976 | Dobby et al. | 52/531 |
| 3,998,021 | A * | 12/1976 | Lewis | 52/531 |
| 4,320,613 | A * | 3/1982 | Kaufman | 52/521 |
| 4,382,354 | A * | 5/1983 | Gailey et al. | 52/521 |
| 4,399,643 | A * | 8/1983 | Hafner | 52/530 |
| 4,432,181 | A * | 2/1984 | Funaki | 52/459 |
| 4,506,486 | A * | 3/1985 | Culpepper et al. | 52/529 |
| 4,788,808 | A * | 12/1988 | Slocum | 52/521 |
| 4,972,647 | A * | 11/1990 | Meldrum | 52/52 |
| 5,349,802 | A * | 9/1994 | Kariniemi | 52/543 |
| 5,465,543 | A * | 11/1995 | Seifert | 52/309.8 |
| 5,502,940 | A * | 4/1996 | Fifield | 52/309.12 |
| 5,537,791 | A * | 7/1996 | Champagne | 52/520 |
| 5,553,434 | A * | 9/1996 | Tamura | 52/545 |
| 5,651,227 | A * | 7/1997 | Anderson | 52/520 |
| 5,681,652 | A | 10/1997 | Cope | |
| 5,768,844 | A * | 6/1998 | Grace et al. | 52/529 |
| 6,050,041 | A * | 4/2000 | Mowery et al. | 52/520 |
| 6,052,961 | A * | 4/2000 | Gibbs | 52/518 |
| 6,195,952 | B1 * | 3/2001 | Culpepper et al. | 52/522 |
| 6,263,574 | B1 * | 7/2001 | Lubker et al. | 29/897.32 |
| 6,301,856 | B1 * | 10/2001 | Nasi | 52/712 |
| 6,321,500 | B1 * | 11/2001 | Manning et al. | 52/555 |
| 6,344,268 | B1 | 2/2002 | Stuckey et al. | |
| 6,367,220 | B1 * | 4/2002 | Krause et al. | 52/512 |
| 6,383,608 | B1 * | 5/2002 | Burkett et al. | 428/173 |
| 6,393,792 | B1 * | 5/2002 | Mowery et al. | 52/520 |
| 6,526,718 | B2 * | 3/2003 | Manning et al. | 52/555 |
| 6,880,306 | B2 * | 4/2005 | Burken et al. | 52/483.1 |
| 6,932,310 | B1 * | 8/2005 | Diss | 248/301 |
| 7,010,894 | B1 * | 3/2006 | Cappelle | 52/480 |
| 7,040,067 | B2 * | 5/2006 | Mowery et al. | 52/519 |
| 7,225,592 | B2 * | 6/2007 | Davis | 52/547 |
| 7,347,482 | B2 | 3/2008 | Powell | |
| 7,478,507 | B2 * | 1/2009 | Krause | 52/546 |
| 7,698,864 | B2 * | 4/2010 | Justice et al. | 52/519 |
| 7,775,009 | B2 * | 8/2010 | King | 52/520 |
| 2002/0029537 | A1 * | 3/2002 | Manning et al. | 52/518 |
| 2003/0029097 | A1 * | 2/2003 | Albracht | 52/27 |
| 2004/0211141 | A1 * | 10/2004 | Sandy | 52/506.01 |
| 2005/0081468 | A1 * | 4/2005 | Wilson et al. | 52/528 |
| 2005/0193674 | A1 * | 9/2005 | Hatkoff | 52/561 |
| 2005/0247022 | A1 * | 11/2005 | Poupart et al. | 52/783.1 |
| 2006/0005492 | A1 * | 1/2006 | Yohnke et al. | 52/405.2 |
| 2006/0026921 | A1 | 2/2006 | Krause | |
| 2006/0037268 | A1 * | 2/2006 | Mahaffey | 52/520 |
| 2006/0042183 | A1 * | 3/2006 | Benes | 52/741.1 |
| 2006/0053715 | A1 * | 3/2006 | Mowery et al. | 52/309.8 |
| 2006/0053716 | A1 * | 3/2006 | Mowery et al. | 52/309.8 |
| 2006/0068188 | A1 * | 3/2006 | Morse et al. | 428/304.4 |
| 2006/0075712 | A1 * | 4/2006 | Gilbert et al. | 52/520 |
| 2007/0011976 | A1 * | 1/2007 | Mowery et al. | 52/506.01 |
| 2007/0078191 | A1 | 4/2007 | Guhde et al. | |
| 2007/0175154 | A1 * | 8/2007 | Wilson et al. | 52/521 |
| 2007/0193177 | A1 * | 8/2007 | Wilson et al. | 52/518 |
| 2007/0212970 | A1 * | 9/2007 | Rockwell et al. | 442/394 |
| 2009/0241458 | A1 * | 10/2009 | Das | 52/519 |

OTHER PUBLICATIONS

International Search Report and Written Opinion dated Dec. 24, 2008, in PCT/US08/82476.

* cited by examiner

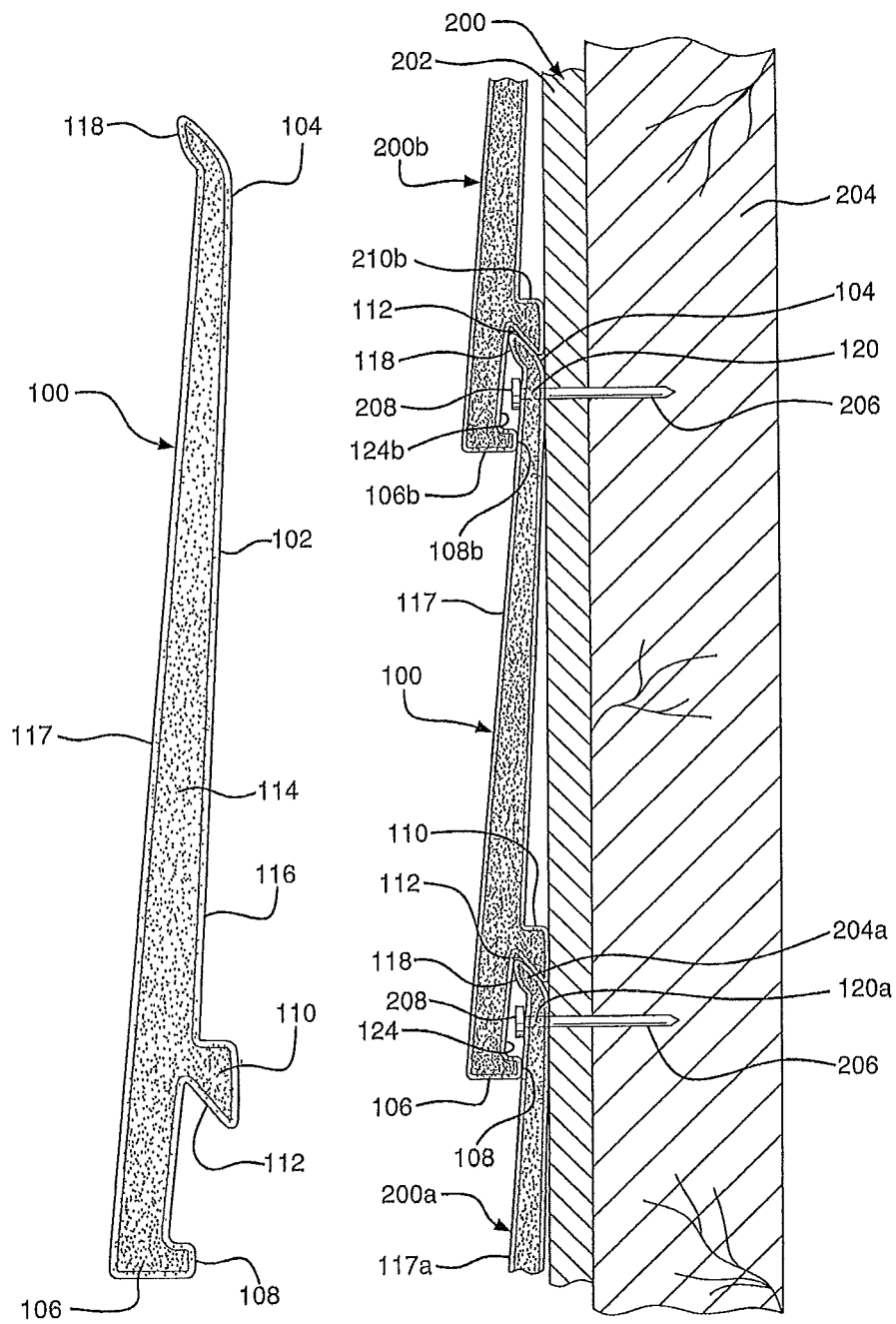

FOAMED BUILDING PANEL, CLIP AND SYSTEM FOR INSTALLATION

CROSS REFERENCE TO RELATED APPLICATIONS

The present application claims the benefit of U.S. Provisional Application No. 61/108,939, filed Oct. 28, 2008 and further claims the benefit under 35 USC §119 of PCT/US2008/82476, filed Nov. 15, 2008.

FIELD OF THE INVENTION

The invention relates to a building panel, clip and a system for installing building panels.

BACKGROUND

U.S. 2006/0026921 A1 discloses a splicing member for securing horizontally adjacent siding panels to one another in an abutting relationship comprising, in combination: a first substantially planar member having an upper edge and a lower edge; a pair of flanges extending outwardly from opposed sides of the first substantially planar member proximate the upper edge; a shoulder extending inwardly from the lower edge of the first substantially planar member; a second substantially planar member extending downwardly from an inner edge of the shoulder; and a pair of projections extending downwardly from the shoulder and outwardly from the second substantially planar member.

U.S. Pat. No. 6,344,268 to Stuckey et al. discloses a foamed polymer composite building material, comprising about 35-73 wt. % polyvinyl chloride (PVC) resin; about 27-65 wt. % fiber, and a specific gravity of about 1.07 g/cc or less, said composite building material including at least 1% porosity by volume of solids and being formed from a molten precursor comprising from about 1.0 parts to about 1.5 parts of a gaseous medium or blowing agent per hundred parts of PVC resin; wherein said building material is capable of having a screw fastener countersunk therein without predrilling.

U.S. 2007/0078191 A1 discloses a foamed PVC building panel with a coefficient of thermal expansion reduced directly by increased talc weight percent in proportion to calcium carbonate weight percent.

U.S. Ser. No. 11/588,577 (unpublished), D0932-00725, discloses solar reflective pigments added to a capstock to reduce solar heating-induced bowing.

SUMMARY OF THE INVENTION

A building panel has a body of the panel extending between a lower drip edge and an upper edge, wherein the upper edge is adapted for fastening to a wall of a building, and the drip edge is adapted to overlap and cover an upper edge of a lower panel of similar construction. The body of the panel has a unitary foamed core, and a unitary cover layer of resinous polymeric material covers the core, the drip edge and the upper edge.

In an embodiment of the invention, each end of a building panel has a vertical clip receiving groove. A corresponding clip is received in one of the clip receiving grooves and protrudes outwardly for receipt in a clip receiving groove of an adjacent panel of similar construction.

According to a feature of the invention, a clip assembles adjacent building panels in abutting and coplanar alignment. The clip is a U-shaped plate having a unitary first narrow edge projecting outward from a bottom wall of the U-shaped plate. The U-shaped plate has a unitary second narrow edge projecting outward from the bottom wall. An embodiment of the clip is a bent and formed plate of aluminum alloy, with the narrow edges being bent upward from the bottom wall. The first narrow edge and the second narrow edge taper from one tall end to another short end, to follow the cross-section taper of a corresponding panel.

A building panel has a body of the panel extending between a lower drip edge and an upper edge, wherein the upper edge is adapted to receive a fastener for fastening the panel to a wall of a building, the upper edge of the panel is adapted to overlap behind a drip edge of another building panel of similar construction, and a raised flange of the panel to engage the drip edge of said another building panel of similar construction, and provide a clearance space to receive an enlarged head of a fastener behind the drip edge.

A system for installing building panels includes, an upper edge of each panel adapted for fastening to a wall of a building, ends of adjacent panels adapted with end edges for mounting flush against each other, each panel having a clip receiving groove, and a clip entering a groove in a first of the adjacent panels and spanning across portions of the adjacent panels to enter a groove in a second of the adjacent panels to interlock with the second of the adjacent panels.

BRIEF DESCRIPTION OF THE DRAWINGS

Embodiments of the invention will now be described by way of example with reference to the accompanying drawings.

FIG. 1 is a cross section of an embodiment of a building panel.

FIG. 2 is a section view of an exterior wall of a building on which building panels are installed.

DETAILED DESCRIPTION

Figure 3:
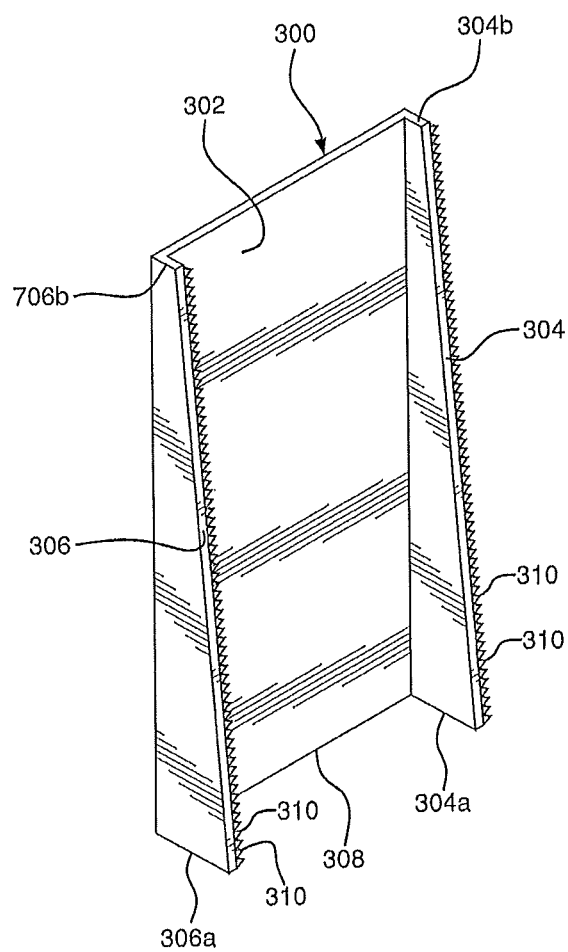
FIG. 3 is an isometric view of a clip.

FIG. 1 discloses a siding panel 100 simulating a horizontal lapstrake siding board to be installed in an over-and-under pattern simulating exterior lapstrake siding. The panel 100 is shown in vertical cross section and is lengthwise in a horizontal direction. The panel 100 has a body portion 102 bounded by a unitary upper edge 104 and a unitary lower drip edge 106. The drip edge 106 refers to a lower edge of the panel 100 from which condensate or precipitation drips off after being repelled by an exterior surface of the panel 100. The upper edge 104 can be referred to as a nailing edge or nailing hem, so named for attaching to a wall of a building with nails or other fasteners. The panel 100 has a raised flange 118 on the upper edge 104. The panel 100 has its bottom edge 106 also known as a drip edge 106 formed with an inwardly turned lip 108 to simulate a thick drip edge of a lapstrake siding board. FIG. 2 discloses a similar panel 200b formed with an inwardly turned lip 108b. The cross-section of the panel 100 tapers from the drip edge 106 to the upper edge 104 to simulate the appearance of a tapered, lapstrake siding board. A horizontal, unitary inner flange 110 of the panel 100 is located above and spaced from the drip edge 106. The inner flange 110 slopes downward at an angle to the horizontal, and has an undercut cavity 112. FIG. 2 discloses a similar panel 200b formed with an inner flange 210b. An interior core 114 of the panel 100 is a unitary foamed resinous polymeric material including, but not limited to polyvinylchloride, PVC, polypropylene, PP and polyethylene, PE with a foaming agent. The polymeric resin is not particularly limited, and suitable polymeric resins may include, but are not limited to, polyvinyl chloride (PVC), chlorinated polyvinyl chloride (CPVC), polyethylene, polypropylene, polycarbonates, polystyrene, styreneacrylonitrile, acrylonitrile butadiene styrene, acrylic/styrene/acrylonitrile block terpolymer (ASA), polysulfone, polyurethane, polyphenylenesulfide, acetal resins, polyamides, polyaramides, polyimides, polyesters, polyester elastomers, acrylic acid esters, copolymers of ethylene and propylene, copolymers of styrene and butadiene, copolymers of vinylacetate and ethylene, and combinations thereof. In addition, the polymeric resin may be post industrial or consumer grade (e.g., regrind). The composition may include one or more polymeric resin. Preferably, the polymeric resin has a weight average molecular weight from about 50,000-100,000 g/mole. In a preferred embodiment, the polymer resin is polyvinyl chloride. Although any polyvinyl chloride may be utilized, it is even more preferred that the polyvinyl chloride has a K-value of from 54-60 (e.g., a weight average molecular weight of from approximately 70,000-100,000 g/mole). The K-value of a polymeric resin is a measure of the molecular weight of the resin based on its inherent viscosity. The lower molecular weight of the polymer resin permits the resin to foam and process more easily than higher molecular weight polymer resins, e.g., resins with a higher K-value. The polymeric resin(s) may be present in the composition from about 60 to about 85% by weight of the active solids in the composition, preferably from about 70 to about 80% by weight of the active solids.

Typical chemical blowing (foaming) agents (e.g., materials that undergo decomposition reactions producing gases) that may be used in the present invention include exothermic and endothermic blowing agents. Examples of exothermic chemical blowing agents suitable for use in the present invention include, but are not limited to, azodicarbonate, p,p-oxybis (benzene) sulfonyl hydrazide, p-toluene sulfonyl hydrazide, p-toluene sulfonyl semicarbazide, dinitrosopentamethyltetramine, and 5-phenyltetrazole. Non-limiting examples of suitable endothermic chemical blowing agents include sodium bicarbonate and sodium borohydride. Some commercially available foaming agents combine a mixture of endo- and exo-thermic foaming agents. Examples of such combined foaming agents include the GMA series from Kibbe Chem Engineered Blowing Agents and Colorants, Inc., the Forticell series from Americhem, Inc. and the Rowa Tramaco Tracel product line. Other suitable chemical blowing agents include compounds that undergo a change of state at the desired foaming temperature, such as, but not limited to, hydroflouro compounds. Supercritical gases such as supercritical $CO_2$, $N_2$, or any other gas that may be pressurized into a liquid may alternatively be added as blowing agents. In addition, air may be utilized as a blowing agent.

According to an embodiment of the invention, the foamed interior core 114 includes a pigment that matches substantially or nearly an exterior surface color of the panel 100, such that, in the event an edge of the core 114 becomes exposed by slight movement of the panel 100, the coloration appearance of the edge of the core 114 will match the exterior surface color of the panel 100. Further, the slight movement can be due to thermal expansion or thermal contraction, which can be minimized by reducing the coefficient of thermal expansion of the core 114. The core 114 can have a coefficient of thermal expansion reduced directly by fillers including, but not limited to talc and calcium carbonate of lower cost than the resin, according to US 2007/0078191 A1 The coefficient of thermal expansion is reduced directly by an increased talc weight percent in proportion to calcium carbonate weight percent, with talc being more efficient than calcium carbonate to reduce the coefficient of thermal expansion.

Figure 4:
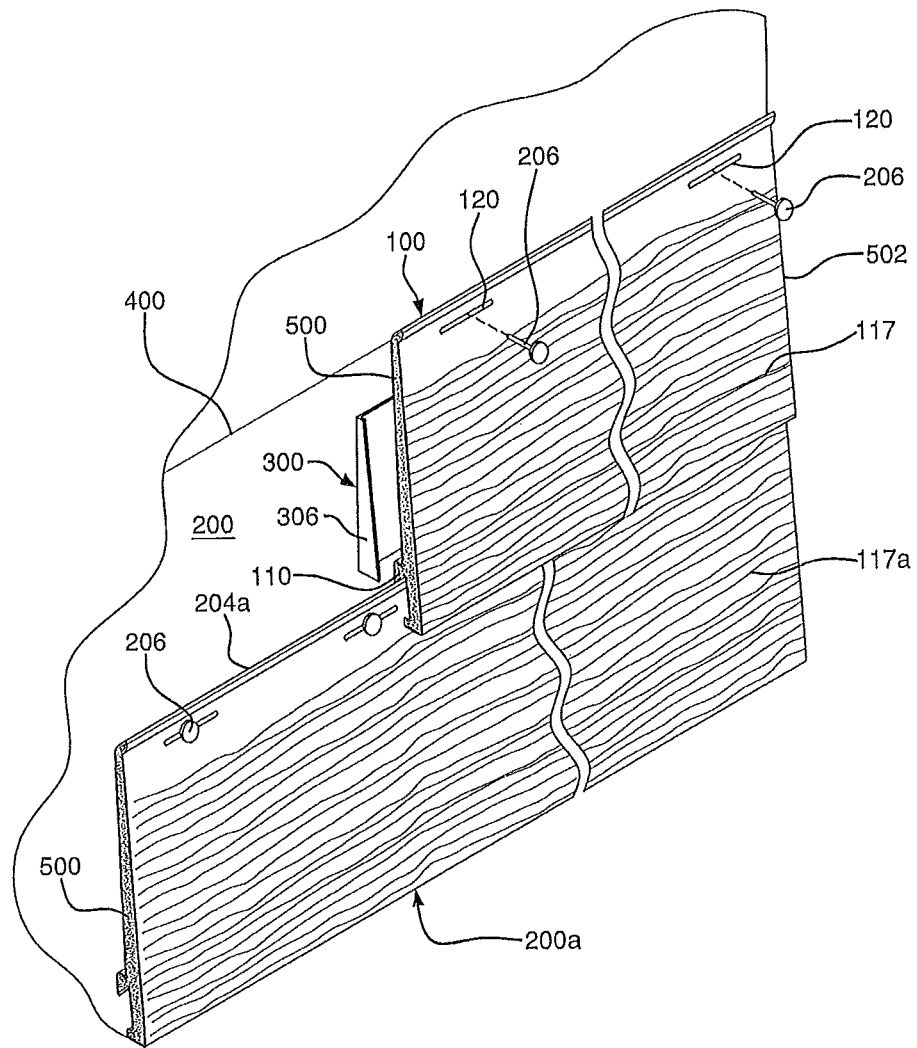
FIG. 4 is an isometric view of a building panel being installed on an exterior wall.

According to an embodiment of the invention, movement of the panel 100 tending to separate the butt joint or tending to misalign adjacent panels is minimized by having a clip 300, FIG. 3, holding the panel 100 in coplanar abutting relationship with an adjacent panel 110a, FIG. 4. The clip 300 obviates a need for fillers in the resin to control the coefficient of thermal expansion. According to another embodiment of the invention, near-IR reflecting pigment is provided in a capstock 116 to minimize thermal expansion by solar-induced heating.

With continued reference to FIG. 1, a unitary capstock 116 of resinous polymeric material covers at least exposed visible portions of the core 114 and can form the exterior surfaces of the upper edge 104, the bottom edge or drip edge 106 and the inner flange 110. The capstock 116 is a resinous polymeric material including, but not limited to acrylic, ASA. The capstock 116 in one layer or two layers provides an exterior surface of the panel 100. The exterior surface 117 is formed with an exposed surface texture of peaks and valleys simulating a weathered wood grain or a hewn surface of natural wood. Compression molding is a preferred process to form the capstock 116 as a surface skin, and to form the surface texture. The capstock 116 can encompass the entire surface of the core 114, or can cover the portion of the surface that is visually exposed or exposed to the weather. The capstock 116 may have a thickness from approximately 0.002-0.02 inches, and preferably a thickness from 0.004 to 0.01 inches. Further, the capstock 116 can provide the inner flange 110 that extends lengthwise of the panel 100 and stiffens the length of the panel 100. The stiffness of the inner flange 110 can be augmented by imbedded reinforcement materials, including but not limited to glass fibers and polymeric fibers. The inner flange 110 can be formed by molding resinous polymeric material of increased molecular weight compared to the molecular weight of the resinous polymeric material of the core 114. Alternatively, the inner flange 110 can be made as a separate structural element of the materials described herein, and becoming imbedded in the material of the capstock 116 or imbedded in the material of the core 114 during injection molding.

The capstock 116 forms a weather barrier to help protect the composite siding product from harmful effects caused by environmental factors such as sun, rain, and wind. Suitable weatherable materials include, but are not limited to polyvinyl chloride (PVC), acrylic resins based upon methyl methacrylate, poly(butylacrylate-styrene-acrylonitrile), polyvinylidene fluoride, polyvinylfloride, and SAN, a copolymer of styrene and acrylonitrile (ASA). In at least one preferred embodiment, the capstock material is an acrylic capstock 116 formed of Acryliguard CS-113 or CS-114, which are commercially available from Rohm and Haas Company. In an alternate embodiment (not illustrated), a weatherable film or paint (e.g., blends of an acrylic and polyvinylidenefluoride resins) may be laminated onto the extrudate to form a final product instead of co-extruding a capstock 116 with the foamed core 114.

An embodiment of the outer layer of the capstock 116 includes near-IR reflecting pigment. Alternatively, the layer of near-IR reflecting pigment can be covered by an outer layer substantially visibly clear, or opaque in color, and transmissive of near-IR wavelengths. The near-IR reflecting pigment is selected from the group consisting of pearlescent pigments, light-interference platelet pigments, ultramarine blue, ultramarine purple, cobalt chromite blue, cobalt aluminum blue, chrome titanate, nickel titanate, cadmium sulfide yellow, cadmium sulfide yellow, cadmium sulfoselenide orange, and organic pigments such as perylene black, phthalo blue, phthalo green, quinacridone red, diarylide yellow, azo red, and dioxazine purple.

FIG. 2 discloses the panel 100, together with similar panels 200a, 200b, which are installed in respective over-and-under courses to simulate an over-and-under lapstrake construction. The panel 100 is one of multiple panels 100 in a horizontal upper course of the panels 100. A horizontal lower course has multiple panels 200a, one of which is shown as a lower panel 200a. A horizontal upper course has multiple panels 200b, one of which is shown as an upper panel 200b. The panel 100 and the similar panels 200a, 200b are installed on the exterior of a wall 200 of a building. The wall 200 can have various constructions. For example, one construction has flat, vertical panels of sheathing 202. In a standard frame construction, the sheathing 202 over a framework of spaced apart, vertical studs 204. Spaces between the studs 204 are filled with thermal insulation, not shown for purposes of illustration. The insulation can be covered by a vapor barrier or a vapor permeable membrane having a permeability that varies with relative humidity in the spaces between the studs 204.

With continued reference to FIG. 2, the panel 100 is installed by stacking the inner flange 110 onto the upper edge 204a of a lower panel 200a that was previously installed in a lower course of multiple lower panels 200a. The inner flange 110 seats against an upper edge 204a of the lower panel 200a. The undercut cavity 112 of the panel 100 receives the upper edge 204a of the lower panel 200a to interlock the panel 100 and the lower panel 200a. The bottom edge or drip edge 106 of the panel 100 extends downward, and is adapted to overlap and cover the upper edge 204a of the lower panel 200a.

With continued reference to FIG. 2, the upper edge 104 of the panel 100 has at least one fastener-receiving slot 120 to receive a fastener 206 therein, such as, a nail or screw having an enlarged head 208, for fastening the panel 100 to the wall 200 of a building. The slot 120 is near the raised flange 118 on the upper edge 104. The fastener 206 is aligned in a corresponding fastener-receiving slot 120, and is driven by wielding a manual or powered, hammer or screwdriver into the wall 200 to fasten the panel 100 to the wall 200. The typical fastener 206 has a length sufficient to extend through the slot 120, and to penetrate through the sheathing 202 and into a stud 204. The fastener head 208 is too large to pass through the slot 120, and registers against the panel 100 to limit further penetration of the fastener 206 into the wall 200. Preferably, one or more fastener-receiving slots 120 and corresponding fasteners 206 are provided to secure the panel 100 in place. More preferably, two spaced apart slots 120, not shown, and two corresponding fasteners 206 maintain the level alignment of the panel 100. However, the level alignment can be maintained solely by one fastener 206 while the horizontal length of the inner flange 110 is stacked against the upper edge 204a of a lower panel 200a in a lower course, which interlocks the panels 100 and 200a. Such a level alignment is helpful to level a panel 100 that has been shortened or sawn with an opening to fit an interruption of the wall 200 including, but not limited to a corner of a building, an opening for a door or window, or conduit for plumbing, electrical or HVAC systems.

With continued reference to FIG. 2, the upper edge 104 of the panel 100 overlaps under an upper panel 200b of similar construction, to be installed above, in another course of panels 200b. More specifically, the upper edge 104 of the panel 100 and the fastener-receiving slot 120 are adapted to overlap behind and under a bottom edge or drip edge 106b of the upper panel 200b. The panel 100 has a raised flange 118 on the upper edge 104 to impinge against the inner side of the upper panel 200b, which provides a clearance space 124b in front of the upper edge 104 and behind the upper panel 200b. The clearance space 124b receives the enlarged head 208 of the fastener 206. The clearance space 124, the fastener 206, the fastener-receiving slot 120 and the upper edge 104, which are hidden behind the bottom edge or drip edge 206b of the upper panel 200b. The bottom edge or drip edge 206b is formed with an inwardly turned lip 208b to simulate a thick edge of a lapstrake siding board. The lip 208b impinges rearwardly against an exterior surface 117 of the panel 100, to resist collapse of a clearance space 124b behind the panel 200b, and to close off the clearance space 124b from below. Similarly, the panel 100 itself is constructed with a lower bottom edge or drip edge 106 to cover and hide the fastener 206 in the clearance space 124, and the upper edge 204a and the fastener-receiving slot 120a of a lower panel 200a.

With continued reference to FIG. 2, the panel 100 has its lower bottom edge or drip edge 106 formed with an inwardly turned lip 108 to simulate a thick edge of a lapstrake siding board. The lip 108 impinges rearwardly against an exterior surface 117a of the lower panel 204a below, to resist collapse of a clearance space 124 behind the panel 100, and to close off the clearance space 124 from below.

FIG. 3 discloses a clip 300 for assembling adjacent panels 100 in abutting, coplanar relationship with one another. The clip 300 is a shaped plate, for example, a U-shaped plate, having a bottom wall 302 and a unitary first narrow edge 304 projecting outward from the bottom wall 302. The shaped plate has a unitary second narrow edge 306 projecting outward from the bottom wall 302. The first narrow edge 304 and the second narrow edge 306 taper from one end 304a, 306a to another end 304b, 706b. The degree of taper matches a taper in the thickness of the panel 100. The clip 300 has a bottom edge 308 for a purpose to be described below with reference to FIG. 6. At least one pair of narrow edges 304, 306 are provided for interlocking adjacent panels 100, 100a, FIGS. 5 and 6. Additional narrow edges 304, 306 can be provided by duplicating the narrow edges 304, 306 that project from the bottom wall 302. For example, the clip is a bent and formed plate of aluminum alloy. Alternatively, the clip is formed by machining or casting to provide duplicated narrow edges 304, 306 that project from the bottom wall 302. For example, the clip 300 is provided with duplicate edges 306, 306 for installation along the grooves 506, 506 in FIG. 7A.

In FIG. 3, the clip 300 has either smooth edges 304, 306, or the edges 304, 306 have rough surfaces 310 to fit with frictional engagement in corresponding grooves 504, 506, wherein the rough surfaces 310 are formed by abrading, machining or punching to provide projecting burrs or teeth to engage in corresponding grooves 504, 506.

Figure 5:
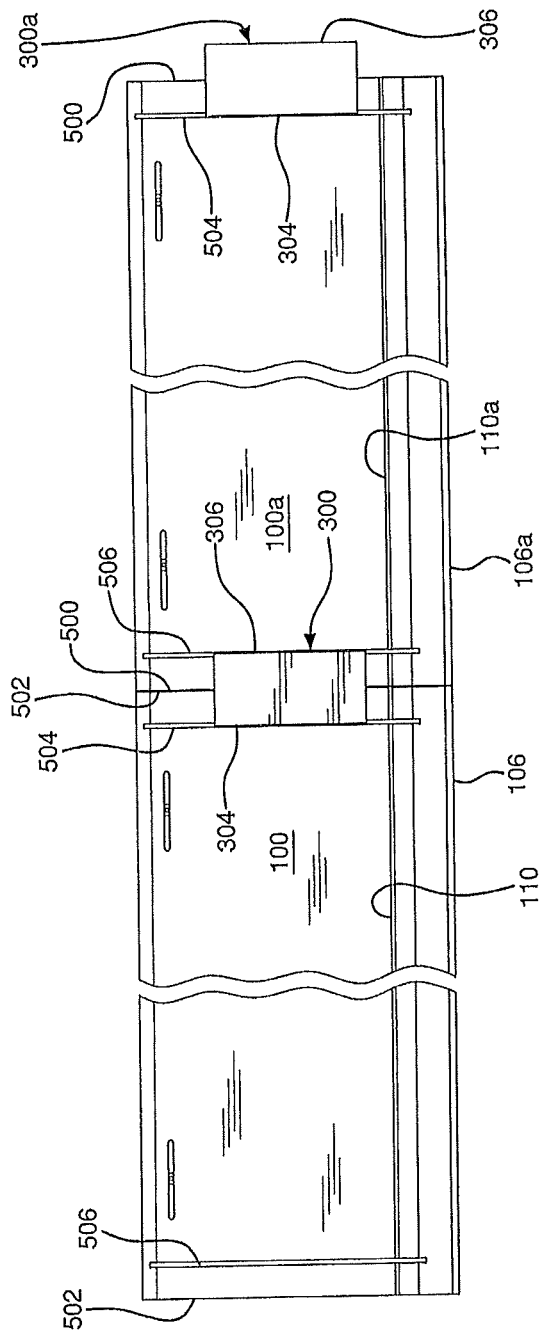
FIG. 5 is an interior elevation view of adjacent building panels held by a clip behind the panels.

With reference to FIG. 5, a system for installing a course of adjacent panels 100, 100a will now be described. FIG. 5 discloses rear surfaces of adjacent panels 100, 100a for installation in the same course, and in abutting coplanar relationship. Opposite ends of the adjacent panels 100, 100a are adapted with end edges 500, 502 for mounting flush against each other. According to an embodiment of the invention, the end edges 500, 502 of each panel 100, 100a are sawn square, meaning that the end edges 500, 502 are vertical and orthogonal to the length, width and height of the corresponding panel 100, 100a. According to another embodiment of the invention, the end edges 500, 502 are angle cut in a direction away from their exterior surfaces 117, 117 to abut the end edges 500, 502 along their exterior surfaces 117, 117. The rear surface of each panel 100, 100a has respective vertical clip receiving grooves 504, 506 adjacent to and parallel with respective end edges 500, 502. Each groove 504, 506 is narrow and extends into the thickness of the panel 100, 100a. A length of each groove 504, 506 extends for a substantial vertical length of the panel 100, 100a. Each groove 504, 506 extends vertically into the unitary inner flange 110, 110a that is located above and spaced from the bottom edge or drip edge 106, 106a. Preferably each groove 504, 506 extends vertically through the unitary inner flange 110, 110a to provide vertical water drains behind the exterior surface 117 and prevent discoloration streaks on the exterior surface 117. The grooves 504, 506 can be made by machining, sawing or molding after extrusion, and can be formed with rounded or chamfered edges to alleviate stress concentration in the material at such edges.

FIG. 4 discloses a first panel 100 that can be installed onto a lower panel 200a in a lower course of lower panels 200a to provide an over-and-under lapstrake appearance. The lower panels 200a are fastened to the wall 200 disclosed by FIG. 2. Alternatively, the first panel 100 can be installed in a starter course, not shown, wherein the starter course is a lowermost course of panels fastened to the wall 200.

With continued reference to FIG. 4, a first clip 300 is assembled to the first panel 100. In FIG. 5, the first clip 300 is further assembled to an adjacent panel 100a. According to a first method of installing the first clip 300, the first clip 300 is installed to the first panel 100 before the first panel 100 is fastened to the wall 200. FIG. 4 discloses the first clip 300 being assembled at the left end edge 500 of the first panel 100. Alternatively, the first clip 300 can be assembled at the right end edge 502 of the first panel 100. The first clip 300 is manually assembled by reaching behind the panel 100 and inserting a first narrow edge 304 of the clip 300 slidably into, and along, one of the vertical grooves 504, which serves as a clip alignment mounting to mount the clip 300 to the first building panel 100. The first clip 300 can be manually assembled blindly, by relying on feeling the clip 300 being inserted behind the panel 100 and into and along the groove 504.

With continued reference to FIG. 4, the first clip 300 protrudes laterally beyond the end edge 500, and can be manually held in place. After the first clip 300 is assembled, the first panel 100 is stacked onto a lower panel 200a, with the inner flange 110 of the first panel 100 interengaging with the upper edge 204a of the lower panel 200a. The panel 100 is impinged against the wall 200, which further impinges the clip 300 against the wall 200 to hold the first clip 300 in the vertical groove 504.

With continued reference to FIG. 4, the first panel 100 is then manually adjusted downward to seat the inner flange 110 against the upper edge of a lower panel 200a in the lower course. Then, the first panel 100 is leveled, using a carpenter's level to assure a level position. Alternatively, it would be advantageous, but not necessary, to apply a level chalk line 400 onto the wall 200, to eliminate a further need to use the carpenter's level. Then at least one fastener 206 is inserted into a corresponding fastener-receiving slot 120, and is driven by a hammer to penetrate into the wall 200, which mounts and attaches the first panel 100 to the wall 200. Depending upon the horizontal length of the first panel 100, additional fastener-receiving slots 120 can be present along the first panel 100, such that, additional fasteners 206 are applied in corresponding slots 120 to fasten the first panel 100 to the wall 200 in a level position. FIG. 4 discloses the first clip 300 protruding beyond the end edge 502 of the first panel 100, which positions the second narrow edge 306 of the clip 300 for assembly of an adjacent panel 100a to the clip 300.

With reference to FIG. 5, the first narrow edge 304 of the clip 300 is slidable into and along a narrow vertical groove 504 in a first building panel 100 to mount the U-shaped plate to the first building panel 100. The second narrow edge 306 is slidably receivable into and along a narrow vertical groove 506 serving as a clip alignment mounting to mount the clip 300 to a second, adjacent building panel 100a. FIG. 5 discloses the adjacent panel 100a being of similar construction as the first panel 100. According to an embodiment of the invention, the clip 300 can be assembled to the edge 500 of the first panel 100 to be exposed for assembly to the adjacent panel 100a. According to another embodiment of the invention, the adjacent panels 100, 100a are abutted along their end edges 500, 502, followed by assembly of the clip 300 downwardly and along the vertical clip receiving grooves 504, 506.

Figure 6:
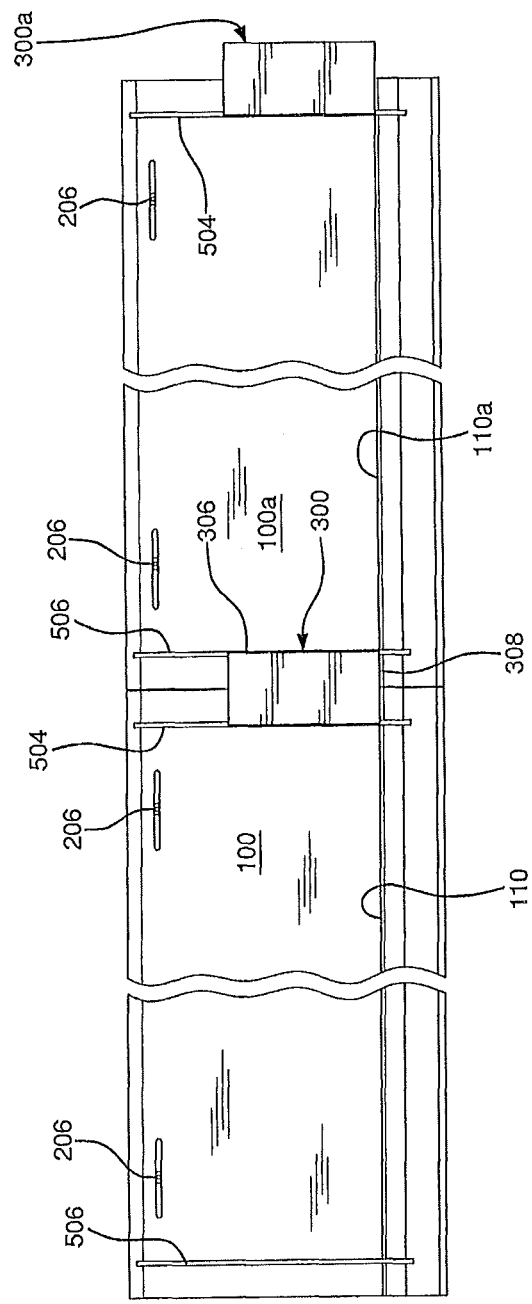
FIG. 6 is a view similar to FIG. 5 with the clip engaging a flange on at least one building panel.

According to an alternative method of installing the clip 300, the panel 100 and the adjacent panel 100a are aligned with their edges 500, 502 in abutting relationship, followed by the first clip 300 being assembled downward behind the abutting panels 100, 100a to align and insert the edges 304, 306 along the grooves 504, 506, respectively. The edges 304, 306 of the clip 300 are slidable relative to the vertical grooves 504, 506. The vertical length of the clip 300 is tapered and is shorter than the lengths of the grooves 504, 506, which allows the clip 300 to adjust in vertical position along the grooves 504, 506. Advantageously, the clip 300 is assembled to the panels 100, 100a without fasteners. FIG. 6 discloses the clip 300 in a position wherein a bottom edge 308 of the clip 300 is seated against the inner flange 110 or 110a of the panels 100 or 100a to limit downward movement of the clip 300 over the passage of time. Alternatively, to limit downward movement of the clip 300 over the passage of time, the clip 300 is held against the wall 200, FIG. 2, when the panels 100, 100a are fastened to the wall 200.

FIG. 5 discloses the clip 300 mounted to rear sides of the first panel 100 and an adjacent panel 100a. The clip 300 and the vertical grooves 504, 506 are completely hidden behind the panels 100, 100a, prior to fastening the panels 100, 100a to the wall 200 by the fasteners 206. The two panels 100, 100a are assembled in abutting, coplanar relationship, in a course of such panels. The first and second narrow edges 304, 306 of the clip 300 serve to hold the first and successive building panels 100, 100a in abutting coplanar relationship, especially during thermal expansion and contraction of the panels 100, 100a.

With reference to FIG. 5, assembly of the panel 100 with an adjacent second panel 100a will now be described. Alignment of the second building panel 100a can be adjusted while the first and second narrow edges 304, 306 of the clip 300 in the vertical grooves 504, 506 hold the first and second building panels 100, 100a in abutting relationship. The clip 300 and the vertical grooves 504, 506 are completely hidden behind the building panels 100, 100a. Accordingly, the clip 300 enters a groove 504 or 506 in a first panel 100 of the adjacent panels 100, 110a and spans across portions of the adjacent panels 100, 100a to enter a groove 506 or 504 in a second of the adjacent panels 100a to interlock with the second panel 100a of the adjacent panels 100, 100a. In addition, a right hand edge 500 of the adjacent panel 100a is abutted against a left hand edge 502 of the first panel 100. The abutting edges 500, 502 provide a butt joint. The butt joint is camouflaged by a color of the abutting edges 500, 502 of the internal core of the panels 100, 100a having the same color as the exterior surface 117 or having a grey color core to appear as a shadow while observed in sunlight.

FIG. 4 discloses adjacent upper and lower courses, wherein the panel 100 is in an upper course, and the panel 200a is in an adjacent lower course. The edge 500 of the panel 100 is offset from vertical alignment with the edge 500 of the panel 200a in an adjacent course. Thereby, structural weakness at the panel edges of one course is offset from the structural weakness at the panel edges of an adjacent course. The structural strength of one panel provides structural support at the panel edges of an adjacent course.

In FIG. 5, the adjacent panel 100a is assembled with a second clip 300a of similar construction as the first clip 300. The manner of assembly of the second clip 300a is similar to the assembly of the first clip 300 to the first panel 100, as described with reference to FIG. 4. Alternatively, the adjacent panel 100a is abutted against another panel 100a, not shown, followed by the second clip 300a being assembled downwardly into and along the grooves 504, 506 of such abutting panels. The second clip 300a is provided to install an additional adjacent panel 100a, not shown, as needed to complete a course of such panels. However, an endmost panel 100, 100a at a beginning or end of a horizontal course of panels 100, 100a does not require the assembly of a clip 300, 300a in the absence of an adjacent panel 100 or 100a.

The adjacent panel 100a is positioned against the first panel 100, and is capable of pivoting a slight amount toward the wall 200, which pivots the adjacent panel 100a onto the first clip 300. The first clip 300 has its second narrow edge 306 received in the groove 506 near the right hand edge 502 of the adjacent panel 100a, such that the first clip 300 holds the adjacent panel 100a in abutment with the first panel 100.

Further, the adjacent panel 100a is pivoted to impinge against the wall 200, which further impinges the second clip 300a against the wall 200 to hold the second clip 300a assembled in the vertical groove 506. Then, the adjacent panel 100a is manually adjusted, first downward to seat against a lower panel 200a in the lower course. Then, after checking the level position, the adjacent panel 100a is manually adjusted into coplanar alignment with the first panel 100, while the first clip 300 holds the two panels 100, 100a in abutting relationship. The clip 300 is slidable relative to the grooves 504, 506, which allows movement of the adjacent panel 100a while being manually adjusted in position. According to an alternative embodiment of the invention, an adhesive can be added between the clip 300 and the panels 100, 100a provided that the setting time of the adhesive is sufficiently lengthy to enable movement of the panels 100, 100a while being manually adjusted into position. According to a further embodiment of the invention, an adhesive can be applied between the abutting end edges 500, 502, and must have the same color as the capstock layer 116 or removed from the surface of the capstock layer 116 before setting to a permanent state.

When position adjustment is complete, the adjacent panels 100, 100a are held by the first clip 300 in abutting coplanar alignment to provide the appearance of a seamless construction. Then, the adjacent panel 100a is checked for being level, and is attached to the wall 200 by at least one fastener 206. The process described above is repeated to install additional adjacent panels 100a, not shown, as needed to complete a course of such panels. An endmost panel 100, 100a at a beginning or end of a horizontal course of panels 100, 100a does not require the assembly of a clip 300, 300a that would protrude beyond the beginning or end of the course.

Figure 7:
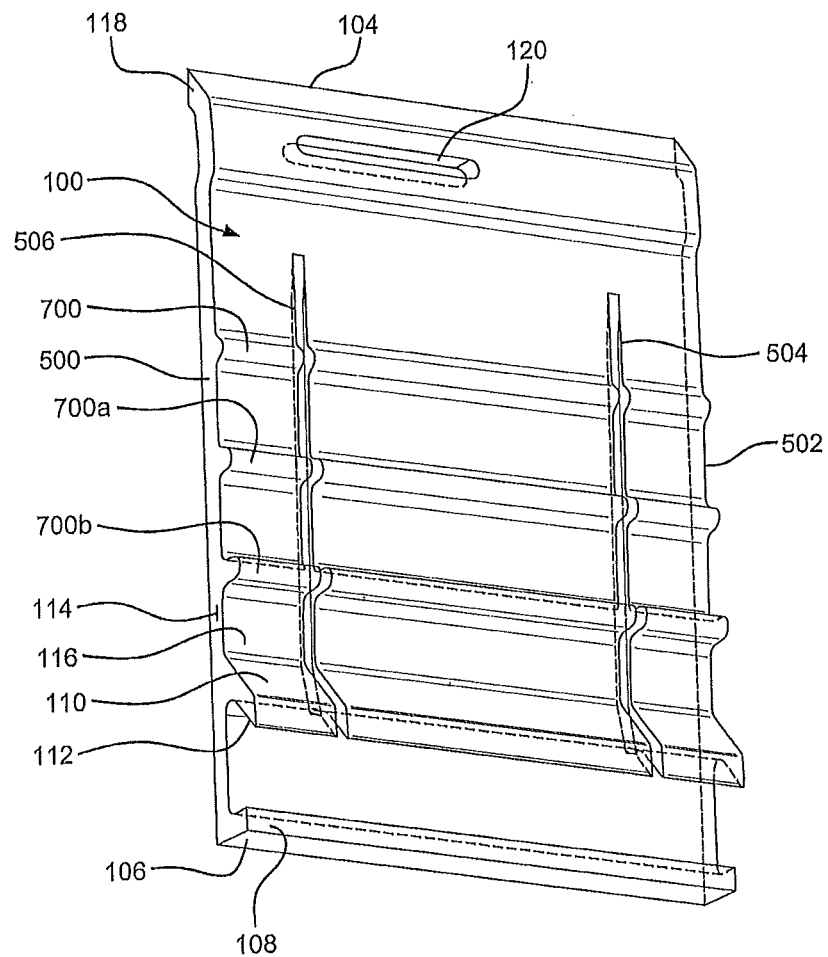
FIG. 7 is an isometric view of an interior side of another embodiment of a building panel.

FIG. 7 discloses another embodiment of the invention wherein a rear side of the panel 100 has one or more projecting ribs 700, 700a, 700b. The panel 100 is adapted for manufacture by extrusion by having the ribs 700, 700a, 700b extend parallel and straight from end edge 500 to the end edge 502, and by having the ribs united by extrusion or molding with the interior core 114 and the capstock 116 of the panel 100. The panel 100 is further adapted for manufacture by extrusion by having the interior core 114 and capstock 16 extending straight with an essentially and substantially constant cross section from end edge 500 to end edge 502. Similarly, the flange 118 on the upper edge 104, the inner flange 110 and the inwardly turned lip 108 on the bottom edge or drip edge 106 extend straight from end edge 500 to end edge 502, and are of constant cross sections, respectively. The grooves 504, 506 extend through the ribs 700, 700a, 700b.

Figure 7A:
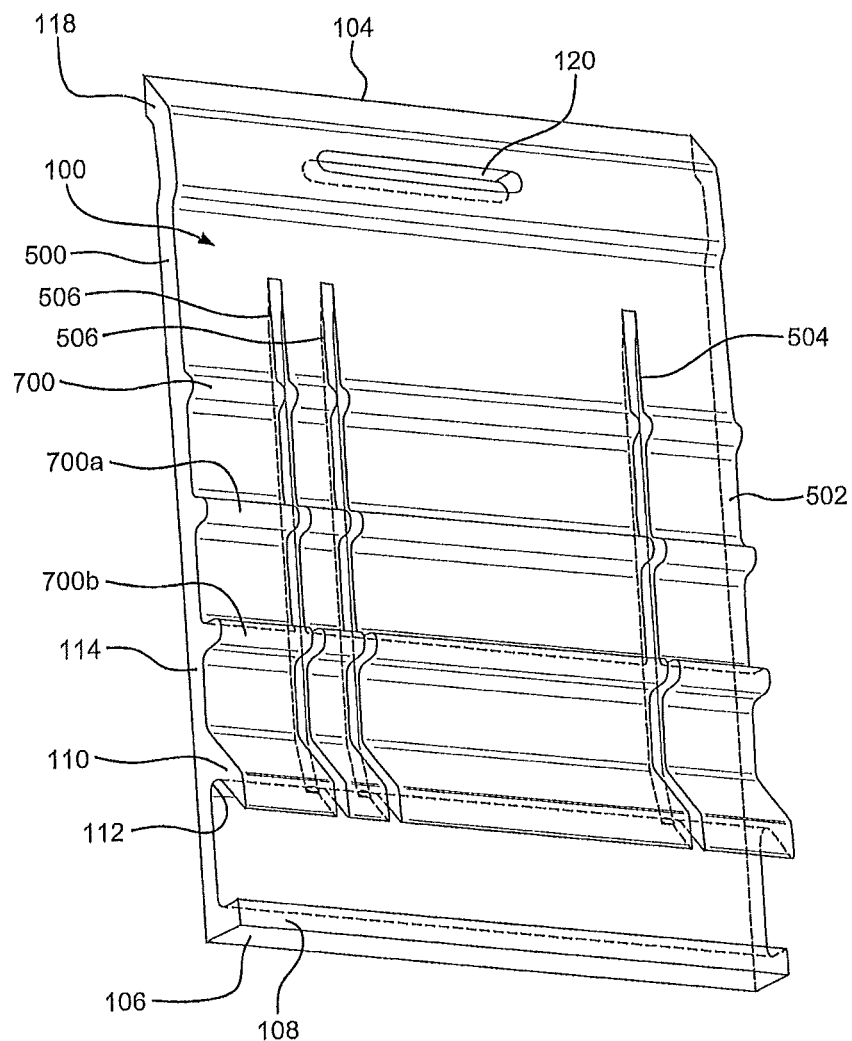
FIG. 7A is a view similar to FIG. 7 of an interior side of a further embodiment of a building panel.

FIG. 7A discloses another embodiment of the invention wherein one or more grooves 504, 506, 506 extend through the ribs 700, 700a, 700b to receive corresponding edges of the clip 300, FIG. 3, wherein the clip 300 is provided with duplicate edges 306, 306 for installation along the grooves 506, 506 in FIG. 7A.

In FIGS. 7, 7A, 8 and 9, the inward flange 110, the bottom edge 106 and the one or more ribs 700, 700a, 700b provide stiffness to maintain the straight orientation of the panel 100. Further the outwardly extending flange 118 provides stiffness to maintain the straight orientation of the panel 100 nailing edge or nailing hem 104. According to embodiments of the invention, the outwardly extending flange 118, the inwardly extending flange 110 and the ribs 700, 700a, 700b are fabricated with the same materials as is the core 114 or the capstock 116, or they include hardener material or stiffener material to increase the elastic modulus, or they are reinforced with reinforcement fibers including but not limited to glass fibers and polymeric fibers, or they are fabricated as rigid rods of metal, wood or other rigid material. The materials of the flanges 110, 118 and the ribs 700, 700a, 700b become united with the panel materials during molding or extrusion of the panel materials.

The panel 100 extends straight with constant dimensions from end edge 500 to end edge 502 to enable fabrication by extrusion. The inwardly directed flange and the ribs 700, 700a, 700b extend straight with constant dimensions from end edge 500 to end edge 502 to enable their fabrication by extrusion. Further, the inwardly extending flange and the ribs 700, 700a, 700b permit the panel 100 to have a thin profile to reduce material consumption.

The panel 100 is fabricated with a constant thickness including the core 114 and capstock 116 for extrusion to produce an extrudate having minimized dimensional distortion during extrusion and cooling to ambient temperature.

Moreover, the ribs compensate for any lack of stiffness in the core 114 and capstock 116 of the panel 100.

The panel 100 in FIG. 7 has grooves 504, 506 similar to the grooves 504, 506 in FIGS. 5 and 6. The grooves 504, 506 in FIG. 7 extend continuously and extend through the ribs 700, 700a, 700b and are formed by cutting, machining or sawing. The edges of the grooves 504, 506 can be rounded or chamfered to alleviate stress concentration in the material adjacent to the grooves.

Figure 8:
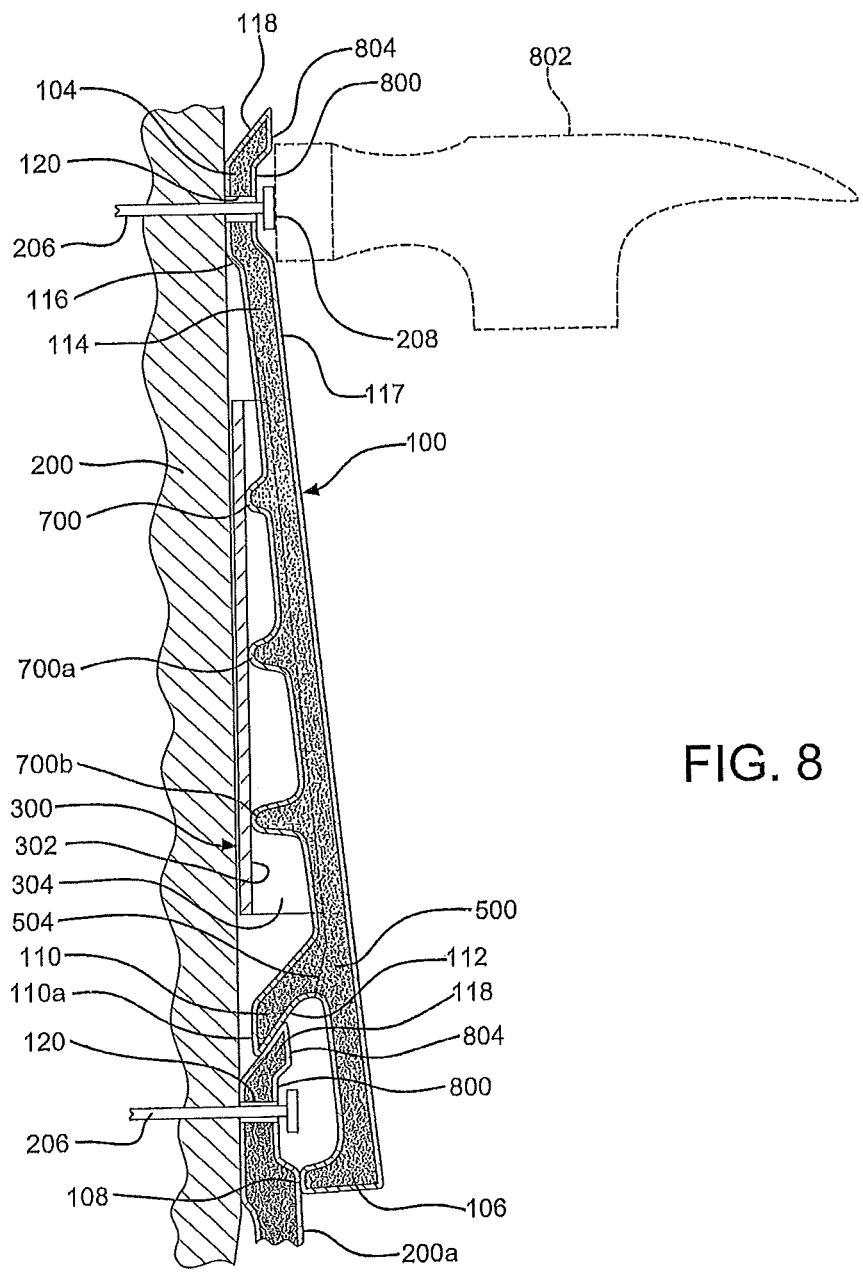
FIG. 8 is an edge view of the building panel of FIG. 7 with a clip of FIG. 3 shown in section to engage and interlock with a panel below or starter strip below in preparation for mounting the building panel to a wall.
Figure 9:
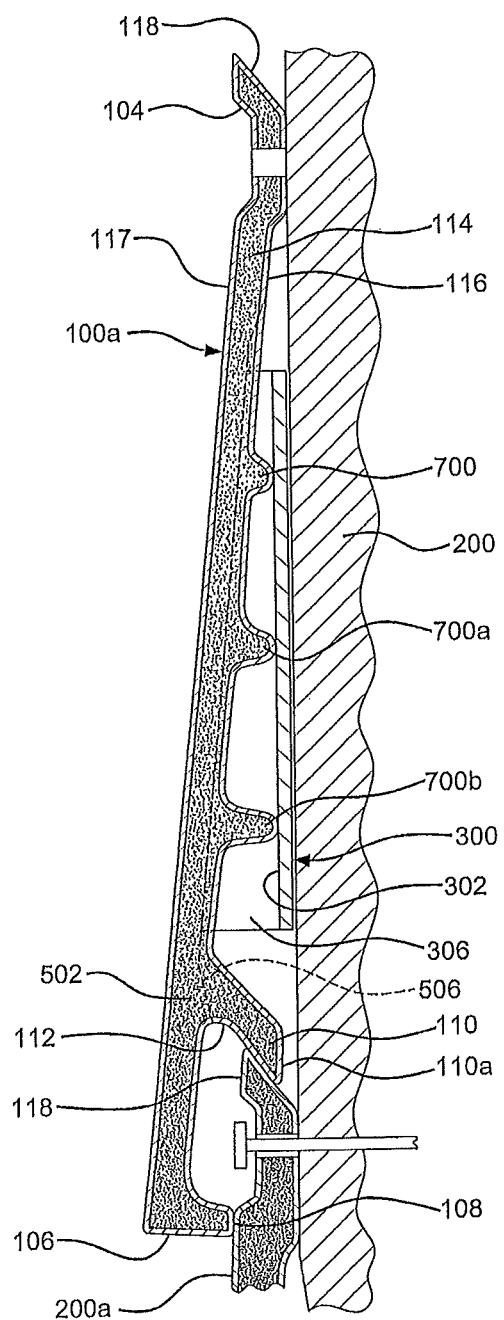
FIG. 9 is another edge view of the building panel of FIG. 7 with a clip of FIG. 3 shown in section to engage and interlock with a panel below or starter strip below in preparation for mounting the building panel to a wall.

FIG. 8 has the groove 504 extending through the unitary inner flange 110 of panel 100. FIG. 9 discloses the groove 506 extending through the unitary inner flange 110 of panel 100a. While the end edges 500, 502 of the panels 100, 100a are abutting, the clip 300 can be assembled behind the panels 100, 100a with the clip edges 304, 306 are aligned with corresponding grooves 504, 506. The edges 304, 306 of the clip 300 are slidable vertically relative to the vertical grooves 504, 506. Further, the edges 304, 306 of the clip 300 are slidable against ends of the projecting ribs 700, 700a, 700b of respective panels 100, 100a. In FIG. 8, the ribs 700, 700a, 700b of panel 100 impinge against the edge 304 of the clip 300 to retain the clip 300 assembled to the panel 100. In FIG. 9, the ribs 700, 700a, 700b of panel 100a impinge against the edge 306 of the clip 300.

Alternatively, the clip 300 is assembled in FIG. 8 similarly as shown in FIG. 4, with the edge 304 of the clip 300 in alignment with the corresponding groove 504 in panel 100. The clip 300 is assembled in FIG. 9 to the panel 100a similarly as shown in FIGS. 5 and 6, with the edge 306 of the clip 300 in alignment with the corresponding groove 506 in panel 100a.

In FIG. 8, each fastener-receiving slot 120 extends through a recessed flat portion 800 of the nailing edge 104 or nailing hem 104. The recessed flat portion 800 extends straight with constant dimensions from end edge 500 to end edge 502 to enable fabrication by extrusion. The spaced apart, fastener nail receiving slots 120 are located similarly as in FIGS. 5 and 6, on a centerline spacing corresponding to a centerline spacing of vertical studs in the wall 200. For example a set of nail receiving slots on 16 inch centerline spacing is provided in the panel 100, and a set of different nail receiving slots on 24 inch centerline spacing is provided in the panel 100. The different slots are identified by indicia, markings or by having different slot shapes.

In FIG. 8, adjacent the recessed flat portion 800 is a raised surface 804 providing a stop surface 804 for a hammer blow to limit the depth to which the fastener head 208 can be driven by hammer blows, wherein a fastener 206 can be driven by a hammer 802 until the head 208 of the fastener 206 is recessed flush or level with the stop surface 804. According to an embodiment of the invention the head 208 stops before applying pressure upon the recessed flat portion 800 of the nailing edge 104. According to an embodiment of the invention, the recessed the nailing edge 104 provides an air gap behind the recessed flat portion 800 of the panel 100 and the wall 200 to which the panel 100 is to be installed. The nailing edge 104 is resiliently deflectable into the air gap to engage the wall 200 to absorb impact. Thereafter, the nailing edge 104 resiliently recovers and resiliently returns to its original straight orientation. According to an alternative embodiment of the invention, the recessed flat portion 800 of the nailing edge 104 can engage the wall 200 to which the panel 100 is to be installed.

In each of FIGS. 8 and 9, the panels 100 and 200a are alike and are adapted to engage and interlock one on another. The nailing edge 104 or nailing hem 104 of the panel 100 is fastened to the wall 200 while the undercut surface 112 of the inner flange 110 of the panel 100 is positioned on and interlocked with the outwardly extending flange 118 below. The flange 118 below is on, either another similar panel 200a below the panel 100, or a starter strip below the panel 100. The interlocked panel 100 and outwardly directed flange 118 below are sufficiently stiff to hold the panel 100 in a straight orientation even while the panel 100 is spaced away from non-straight irregularities in the wall 200. Further the inner flange 110 is aligned by interlocking with the flange 118 below to extend straight and spaced from the wall 200 to compensate for non-straight surface irregularities in the wall 200, and to position the one or more ribs 700, 700a, 700b to extend straight and spaced from the wall 200 to compensate for non-straight surface irregularities in the wall 200. According to an embodiment of the invention, the upper nailing edge 114 or nailing hem 114 of the panel 100 can be spaced away from the wall 200, due to the panel 100 being provided with the stop surface 804 for limiting the extent of a hammer blow, to limit the depth to which the fasteners 206 are driven into the wall 200. According to an embodiment of the invention, in FIGS. 8 and 9, the undercut surface 112 of the inner flange 110 adjustably engages and interlocks with the flange 118 below to adjust the vertical position of the panel 100 relative to the wall 200, while the panel 100 hides the fasteners 208 of the panel 200a below, or a starter strip below, such that the panel 200a, or starter strip below, is blind nailed.

In FIGS. 8 and 9, the installed panel 100 provides a rain screen with a backside air gap behind the panel 100 for drainage of wind driven rain and water behind the panel 100 to qualify for use in storm prone coastal geographies. The rain screen with backside air gap is provided by the inner flange 110 of the panel 100 positioned and interlocked on the flange 118 below, while the flange 118 below projects at an angle outward from the vertical wall 200, to locate the panel 100 with an air gap between the inner flange 110 and the wall 200 on which the panel 100 is to be installed. The air gap is maintained while the nailing edge 104 engages and is fastened to the wall 200. Further, the rain screen with backside air gap is provided by the ribs 700, 700a, 700b positioned to provide respective air gaps between the panel 100 and the wall 200 on which the panel 100 is to be installed. The air gaps provide air pressure relief and water drainage passages directed behind the panel 100 prevent water streaked stains on the surface of the panel 100. The vertical grooves 504, 506 provide additional air pressure relief and water drainage passages behind the panel 100.

Further, the panel 100 and the ribs 700, 700a, 700b are resiliently deflectable into the rain screen with backside air gap behind the panel 100, and toward and against the wall 200 to absorb impact. Thereafter the panel 100 and ribs 700, 700a, 700b resiliently return to straight orientations.

Figure 10:
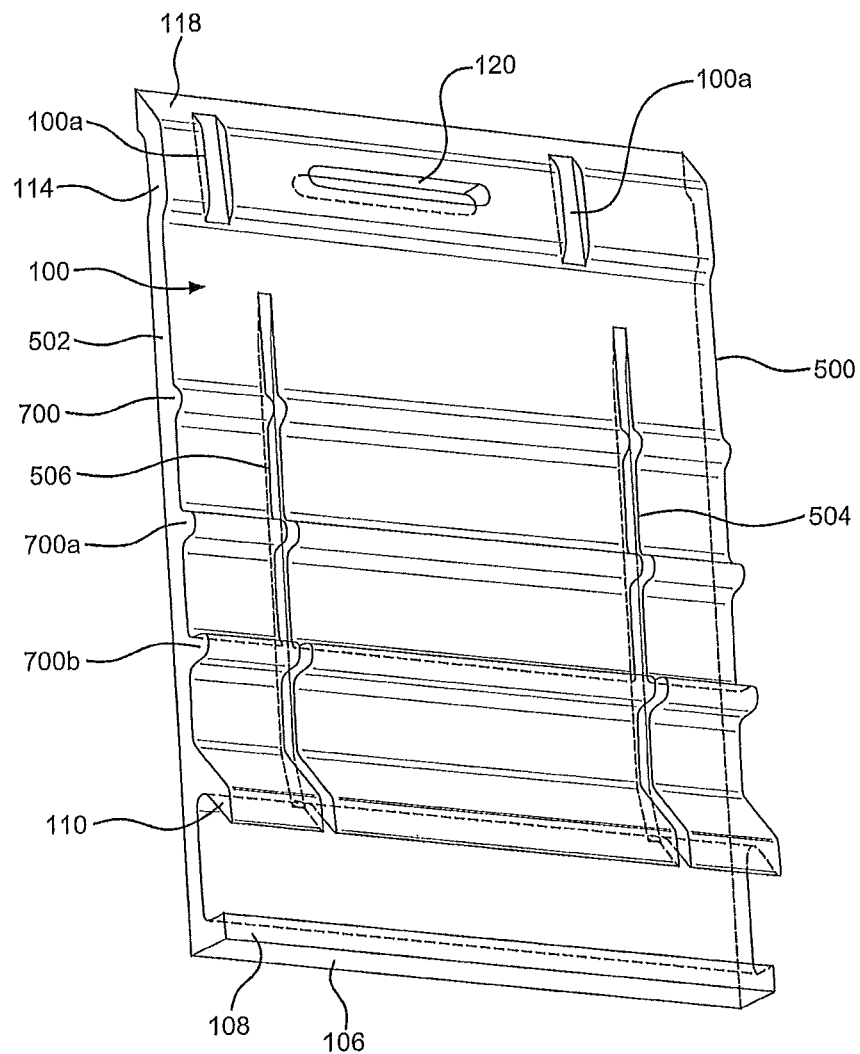
FIG. 10 is an isometric view of an alternative embodiment of a building panel.

FIG. 10 discloses another embodiment of the invention wherein the nailing edge 104 or nailing hem 104 has one or more vertical passages 100a behind the panel 100 formed by cutting or formed during molding of the panel 100 to provide air pressure relief and water draining passages behind the nailing edge 104 and behind the panel 100 to prevent water streaked stains on the surface of the panel 100.

Figures 11, 12:
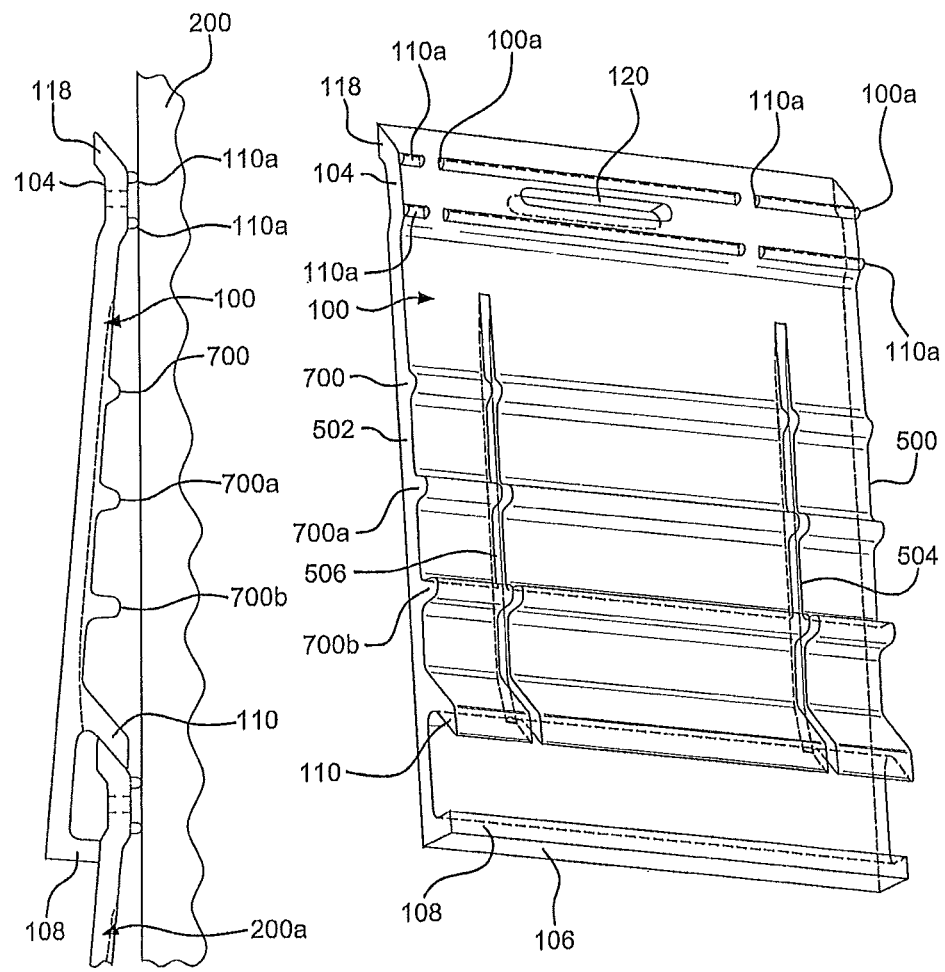
FIG. 11 is an isometric view of another alternative embodiment of a building panel.
FIG. 12 is an edge view of the building panel of FIG. 11 to engage and interlock with a panel below or starter strip below in preparation for mounting the building panel to a wall.

FIG. 11 discloses another embodiment of the invention wherein the vertical passages 100a behind the panel 100 extend vertically through one or more elongated ribs 110a. The ribs 110a extend straight from end edge 500 to end edge 502 with constant cross section dimensions to enable fabrication by extrusion. The vertical passages 100a formed by cutting though the ribs 110a or are molded with the ribs 110a to provide air pressure relief and water draining passages behind the nailing edge 104 and behind the panel 100 to prevent streaking on the surface of the panel 100.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Patents and patent applications referred to herein are hereby incorporated by reference in their entireties. Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A building panel comprising:
   a body of a panel extending between a lower bottom edge or drip edge and an upper edge, wherein the upper edge is adapted for fastening to a wall of a building, and the bottom edge or drip edge is adapted to overlap and cover an upper edge of a lower panel of similar construction;
   the body of the panel having a unitary foamed core;
   a unitary cover layer of resinous polymeric material covering at least exposed visible portions of the core, the bottom edge or drip edge and the upper edge; and
   a vertical clip receiving groove in said body of the panel, wherein the vertical clip receiving groove has a length which extends for a substantial vertical length of the panel, the vertical clip receiving groove adapted to receive a vertical edge of a corresponding clip for vertical sliding movement in the vertical clip receiving groove, while the clip is adapted to connect to an adjacent panel of similar construction.

2. The building panel of claim 1 wherein the foamed core includes a coloration material that matches a color of an exterior surface or a gray color.

3. A building panel comprising:
   an upper edge of the panel being horizontal and adapted for fastening to a wall of a building;
   each of first and second ends of the panel having a vertical clip receiving groove, wherein the vertical clip receiving groove has a length which extends for a substantial vertical length of the panel; and
   a corresponding clip received in the vertical clip receiving groove in one of the first and second ends, and the clip being vertically slidable in the vertical clip receiving groove, the clip projecting outwardly of the vertical clip receiving groove and spanning across a portion of the panel for slidable receipt in another clip receiving groove of an adjacent panel of similar construction;
   wherein the panel has a body having a unitary foamed core and a unitary cover layer of resinous polymeric material covering at least exposed visible portions of the unitary foamed core.

4. A building panel comprising:
   a body of a panel extending between a lower bottom edge or drip edge and an upper edge, wherein the bottom edge or drip edge is adapted to overlap another building panel of similar construction;
   the upper edge having at least one slot adapted to receive a fastener therein for fastening the panel to a wall of a building;
   the upper edge being adapted to overlap behind and under a bottom edge or drip edge of another panel of similar construction;
   a raised flange on the upper edge adapted to impinge against said another panel of similar construction and provide a clearance space receiving the fastener under said another panel of similar construction; and
   a vertical clip receiving groove, wherein the vertical clip receiving groove has a length which extends for a substantial vertical length of the panel, the vertical clip receiving groove adapted to receive a corresponding clip for vertical slidable movement in the vertical clip receiving groove, while the clip is slidable vertically in another vertical clip receiving groove of an adjacent panel of similar construction;
   wherein the body has a unitary foamed core and a unitary cover layer of resinous polymeric material covering at least exposed visible portions of the unitary foamed core, the bottom edge or drip edge, and the upper edge.

5. A building panel comprising:
   a body of a panel extending between a unitary lower bottom edge or drip edge and a unitary upper edge, wherein the upper edge is adapted for fastening to a wall of a building;
   a bottom edge or drip edge of the panel being adapted to overlap and cover an upper edge of another building panel of similar construction;
   an inner flange of the panel adapted to stack onto the upper edge of said another building panel of similar construction; and
   a vertical clip receiving groove, wherein the vertical clip receiving groove has a length which extends for a substantial vertical length of the panel and through the inner flange, the vertical clip receiving groove adapted to receive therein a vertically slidable portion of a corresponding clip for vertical slidable movement in the vertical clip receiving groove, the clip being adapted for connection in another vertical clip receiving groove of an adjacent panel of similar construction;
   wherein the body has a unitary foamed core and a unitary cover layer of resinous polymeric material covering at least exposed visible portions of the unitary foamed core, the bottom edge or drip edge, and the upper edge.

6. A building panel comprising:
   a body of a panel extending between a lower bottom edge or drip edge and an upper edge, wherein the upper edge is adapted for fastening to a wall of a building;
   the upper edge of the panel being adapted to overlap behind a bottom edge or drip edge of another building panel of similar construction;
   a raised flange of the panel adapted to engage the bottom edge or drip edge of said another building panel of similar construction, and provide a clearance space to receive an enlarged head of a fastener behind the bottom edge or drip edge; and
   a vertical clip receiving groove, wherein the vertical clip receiving groove has a length which extends for a substantial vertical length of the panel, and a vertically slidable portion of a corresponding clip being vertically slidable therein after being received in the groove, the clip being slidable in another vertical clip receiving groove of an adjacent panel of similar construction;

wherein the body has a unitary foamed core and a unitary cover layer of resinous polymeric material covering at least exposed visible portions of the unitary foamed core, the bottom edge or drip edge, and the upper edge.

7. A system for installing building panels, comprising:

first and second adjacent panels, wherein each of the first and second adjacent panels has an upper edge adapted for fastening to a wall of a building;

each of the first and second adjacent panels being adapted with corresponding first and second end edges for mounting flush against each other;

the first of the first and second adjacent panels having a vertical clip receiving groove, wherein the vertical clip receiving groove has a length which extends for a substantial vertical length of the panel, and the second of the first and second adjacent panels having another vertical clip receiving groove;

a clip having a vertical edge moveable vertically slidable in the vertical clip receiving groove in the first of the first and second adjacent panels and spanning across portions of the first and second adjacent panels, and the clip having another vertical edge moveable vertically slidable in the another clip receiving groove in the second of the first and second adjacent panels;

wherein the panels each have a body having a unitary foamed core and a unitary cover layer of resinous polymeric material covering at least exposed visible portions of the unitary foamed core and the upper edge.

8. The system of claim 7, comprising:

the panels having interior portions providing air gaps between the interior portions and a wall to which the building panels are to be fastened to allow air pressure relief and water drainage behind the panels.

9. The system of claim 7, comprising:

the adjacent panels engaging the clip with multiple ribs on the first and second adjacent panels.

10. A clip assembled in first and second vertical grooves respectively provided in first and second adjacent building panels, wherein the first and second vertical grooves have first and second lengths which extend for a substantial vertical length of the adjacent building panels which are in abutting and coplanar alignment, wherein the clip is a shaped plate having a unitary first edge projecting outward from a bottom wall of the shaped plate and adapted for vertical slidable movement in the first vertical groove of the first and second vertical grooves, the shaped plate has a unitary second edge projecting outward from the bottom wall and adapted for vertical slidable movement in the second vertical groove of the first and second vertical grooves, and the first edge and the second edge taper from one tall end to another short end, to follow respective cross-section tapers of the adjacent building panels;

wherein the panels each have a body having a unitary foamed core and a unitary cover layer of resinous polymeric material covering at least exposed visible portions of the unitary foamed core.

11. The clip of claim 10 wherein an edge of the bottom wall seats against a horizontal flange of the first panel to limit sliding of the shaped plate.

12. The clip of claim 10 wherein the first edge and the second edge are inclined, and the vertical grooves are inclined.

13. The clip of claim 10 wherein the first edge is adapted for slidable receipt along the vertical groove in the first building panel to mount the shaped plate to the first building panel, the second edge is adapted for slidable receipt along the vertical groove in the second building panel to adjust vertical alignment of the second building panel while the first and second edges hold the first and second building panels in abutting relationship, while the shaped plate and the vertical grooves are completely hidden behind the building panels.

14. A building panel comprising:

an upper edge of the panel being horizontal and adapted for fastening to a wall of a building;

at least two projection ribs at a rear side of the panel;

each of first and second ends of the panel having a vertical clip receiving groove, wherein the vertical clip receiving groove extends through the at least two projection ribs; and a corresponding clip received in the vertical clip receiving groove in one of the first and second ends, and the clip being vertically slidable in the vertical clip receiving groove, the clip projecting outwardly of the vertical clip receiving groove and spanning across a portion of the panel for slidable receipt in another clip receiving groove of an adjacent panel of similar construction;

wherein the panel has a body having a unitary foamed core and a unitary cover layer of resinous polymeric material covering at least exposed visible portions of the unitary foamed core.

* * * * *